US009451113B2

(12) United States Patent
Bezenek et al.

(10) Patent No.: US 9,451,113 B2
(45) Date of Patent: Sep. 20, 2016

(54) SERVICING A PRINT HEAD ARRAY (71) Applicant: HEWLETT-PACKARD DEVELOPMENT COMPANY, L.P., Houston, TX (US)

(72) Inventors: Myron A. Bezenek, San Marcos, CA (US); Ricardo Espinoza-Ibarra, San Diego, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/878,472

(22) Filed: Oct. 8, 2015

(65) Prior Publication Data
US 2016/0028910 A1 Jan. 28, 2016

Related U.S. Application Data (63) Continuation of application No. 13/130,451, filed as application No. PCT/US2008/087268 on Dec. 17, 2008, now Pat. No. 9,230,195.

(51) Int. Cl.
| G06K 15/10 | (2006.01) |
| H04N 1/00 | (2006.01) |
| G06K 15/00 | (2006.01) |
| G06F 3/12 | (2006.01) |

(52) U.S. Cl.
CPC ........ *H04N 1/00909* (2013.01); *G06F 3/1296* (2013.01); *G06K 15/00* (2013.01); *G06K 15/102* (2013.01); *H04N 1/00005* (2013.01); *H04N 1/00015* (2013.01); *H04N 1/00037* (2013.01); *H04N 2201/0094* (2013.01)

(58) Field of Classification Search
None
See application file for complete search history.

(56) References Cited

U.S. PATENT DOCUMENTS

| 5,838,343 | A | 11/1998 | Chapin |
| 7,086,716 | B2 | 8/2006 | Steinfield |
| 9,230,195 | B2 * | 1/2016 | Bezenek ................ G06K 15/00 |
| 2002/0163555 | A1 | 11/2002 | Lin |
| 2003/0038856 | A1 | 2/2003 | Vega et al. |
| 2003/0081035 | A1 | 5/2003 | Van Veen |
| 2004/0085383 | A1 | 5/2004 | Rasmussen |
| 2005/0248606 | A1 * | 11/2005 | Hoshiyama ............ B41J 29/393 347/19 |
| 2006/0098035 | A1 | 5/2006 | Matz |
| 2006/0139396 | A1 * | 6/2006 | Baker ....................... B41J 2/165 347/22 |
| 2006/0280540 | A1 | 12/2006 | Han |
| 2007/0057993 | A1 | 3/2007 | Youn et al. |
| 2008/0055352 | A1 * | 3/2008 | Toh ......................... B41J 2/2139 347/16 |
| 2008/0187326 | A1 | 8/2008 | Shin |
| 2009/0073482 | A1 | 3/2009 | Tsuchiya |
| 2009/0091596 | A1 | 4/2009 | Askeland et al. |

FOREIGN PATENT DOCUMENTS

| JP | 2006116715 A | 5/2006 |
| JP | 2008290370 A | 12/2008 |

OTHER PUBLICATIONS

International Search Report and Written Opinion received in PCT Application No. PCT/US2008/087268, May 29, 2009, 15 pages.

* cited by examiner

*Primary Examiner* — John Wallace
(74) *Attorney, Agent, or Firm* — HP Inc. Patent Department (57) ABSTRACT

A print controller initiates printing of a print job by at least one print head array of a printing system. In response to determining that the at least one print head array should be serviced, the print controller determines whether the servicing of the at least one print head array will interrupt the print job. In response to determining that the servicing will not interrupt the print job, the print controller causes movement of the at least one print head array from a given position to a servicing station of the printing system. In response to determining that the servicing will interrupt the print job, the print controller performs other tasks.

20 Claims, 6 Drawing Sheets

SERVICING A PRINT HEAD ARRAY

CROSS REFERENCE TO RELATED APPLICATIONS

This is a continuation of U.S. application Ser. No. 13/130,451, filed May 20, 2011, which is a national stage application under 35 U.S.C. §371 of PCT/US2008/087268, filed Dec. 17, 2008, both hereby incorporated by reference.

BACKGROUND

Conventional servicing of a print head array is often dependent on fixed situations, such as when a severe error occurs and/or at periodic fixed intervals based on previous instructions. This traditional form of servicing often is inflexible and often does not take into consideration different user preferences of quantity versus quality for various situations. This often results in significant unwanted downtime which leads to reduced output, even when a user considers the image quality sufficient and would like to continue printing. The user may thus feel that they are bound by these fixed circumstances and have no control or flexibility in the printing. This may especially be dissatisfying when the user would like to continue to print in order to meet an impending deadline. On the opposite end, the user may feel that image quality is not acceptable even when there is no severe error detected. As a result, the printing apparatus may continue to print unsatisfactory images that the user feels is unacceptable and thus waste resources in the form of time, media, and ink.

Further, the servicing of a print head array conventionally involves halting a print job entirely while a print head or a print head array is being serviced without offering an option to resume printing the same image with another print head array while the erred print head array is being serviced.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

The present invention differs from previous approaches by offering flexibility to a user when printing upstream or downstream by controlling when a print head array is to be serviced based not only on traditional error conditions, but when the user wishes to choose quality over quantity of the images printed or quantity over quality of the images printed. A common practice for conventional servicing of a print head array is dependent on fixed conditions on when an error is detected, such as when a nozzle head has crashed, a nozzle is clogged, and/or when a misalignment occurs. Further conventional methods of servicing a print head array may involve always stopping the print job entirely, regardless of whether or not an image or print job is currently being printed, or always completing the printing of an image or the print job.

As a result, a user may find that images are continued to be printed when the user does not find that the image quality is satisfactory, thereby wasting resources, or that images that are salvageable are not being printed or completed when the user feels that the image quality for the images are sufficient, further wasting resources and time. This ultimately leads to wasted time in servicing the printing apparatus when not desired, wasted resources in printing unsatisfactory images, and an unsatisfactory printing experience for the user. The present invention alleviates many of these issues and concerns by taking into consideration an image quality when determining whether to service a print head array and determining whether to halt or continue printing an image or print job when an image or print job is currently being printed.

Figure 1:
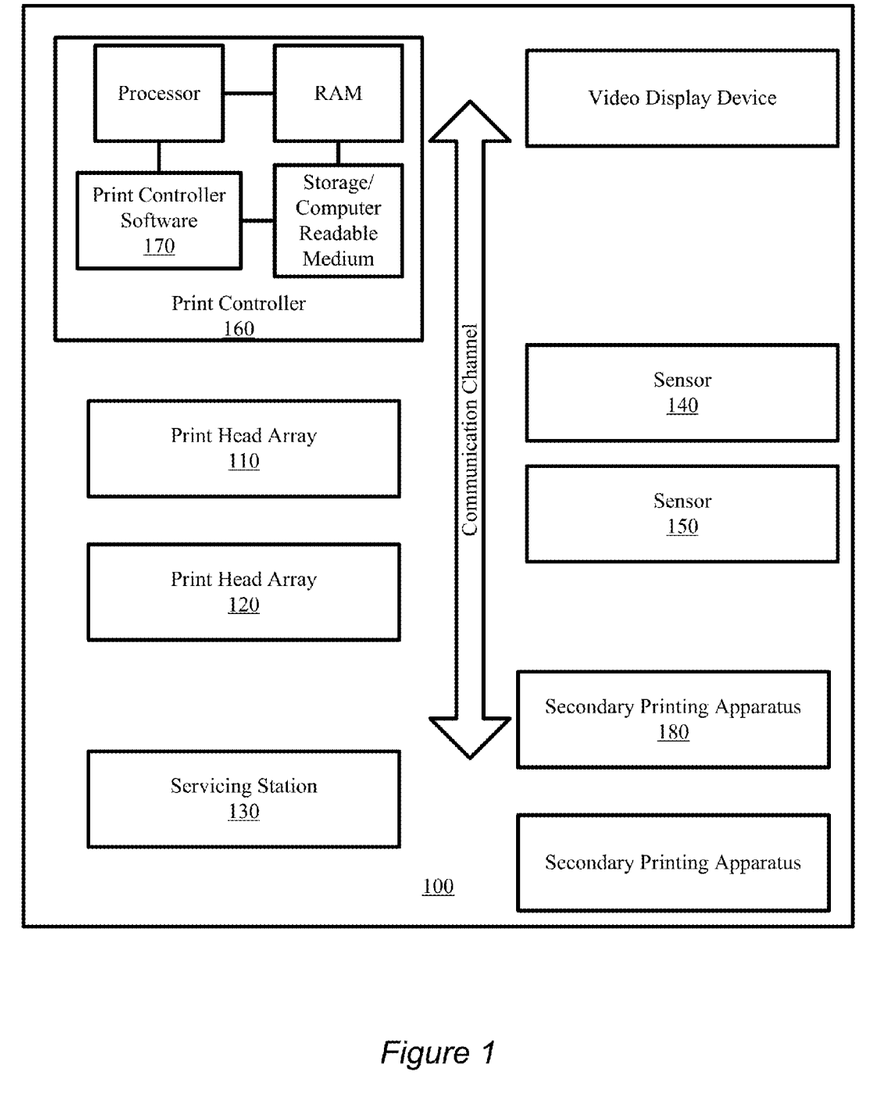
FIG. 1 illustrates a printing apparatus, various components and devices included in the printing apparatus, and various components and devices attached to the printing apparatus according to an embodiment of the invention.

FIG. 1 illustrates a printing apparatus, various components and devices included in the printing apparatus, and various components and devices attached to the printing apparatus according to an embodiment of the invention. A printing apparatus is an apparatus that may access print data from at least one print job to print one or more images, text, and/or patterns on one or more sides of a sheet upon instruction. As illustrated in FIG. 1, the printing apparatus may include a print controller, at least one print head array, at least one additional print head array, a servicing station, at least one sensor, a video display device, and at least one secondary printing apparatus. Further, as illustrated in FIG. 1, the print controller which may further include a PROCESSOR, RAM, computer readable medium, and print controller software. The printing apparatus may include additional devices and/or components and may be attached and/or coupled to additional devices or components in addition to and/or in lieu of those depicted in FIG. 1.

As noted above, the printing apparatus 100 may include a printer controller 160, which may be used to control the printing apparatus 100 and include a PROCESSOR, RAM, Storage/Computer Readable Medium, and print controller software 170. The print controller software 170 may manage the operations of the printing apparatus 100, in conjunction with the print controller 160, by sending instructions to one or more components and/or devices coupled to the printing apparatus 100. It will be understood that the term, at least one print head array, is used to describe a print head array that is initially encountered before encountering at least one additional print head array. It will further be understood that the term, at least one additional print head array, is used to describe a print head array that is encountered after encountering at least one print head array. As a result, depending on whether a sheet or web of media is moving up or down stream, will determine whether a print head array may be considered at least one print head array or at least one additional print head array for purposes of this application.

The print controller software 170 may be firmware that is embedded onto the print controller 160 or the printing apparatus 100. Additionally, the print controller software 170 may be a software application stored on the printer apparatus 100 through a storage medium readable and accessible by the printing apparatus 100 or the print controller software 170 may be stored on a computer readable medium readable and accessible by the printing apparatus 100 from a different location. Further, the print controller software 170 may be stored and/or accessed through a server coupled through a local area network or a wide area network. The print controller software 170 may communicate with the print controller 160 and/or other additional devices and/or components coupled to the printing apparatus 100 physically or wirelessly through one or more communication channels included in or attached to the printing apparatus 100.

In one embodiment, a sheet or web of media may be traveling down stream and initially make contact with print head array 110 before making contact with print head array 120. As a result for the present embodiment, print head array 110 will hereby be referred to as at least one print head array 110, and print head array 120 will hereby be referred to as at least one additional print head array 120. The print controller software 170 may initially determine whether there are any images to be printed in a print job and instruct at least one print head array 110 or at least one additional print head array 120 to print the image and/or any additional images from the print job on at least one sheet of media. The print controller software 170 may then determine whether at least one print head array 110 and/or any additional print head arrays 120, coupled to the printing apparatus 100, needs to be serviced. At least one print head array 110 and any additional print head array 120 may include at least one print head coupled to the printing apparatus 100 that may be used to print at least one image and/or text onto at least one sheet of media. In determining whether at least one print head array 170 needs to be serviced, the print controller software 170 may scan at least one image from a print job for a defect in image quality and create an image quality defect value. At least one image from a print job may be an image, text, or a combination of text and images. A print job may include data indicating the number of pages and/or number of images to be printed, whether to print in duplex mode or single sided mode, the type of sheets to print on, such as media type, as well as the size of sheets to print on. The print job may be created from at least one image and/or data that has been captured through a scanner, a fax, a copier, and/or another device, such as a computer.

As noted above, the print controller software 170 may scan at least one image from the print job for a defect in image quality and create an image quality defect value. In creating the image quality defect value for at least one image and/or any additional image of a print job, the print controller software 170 may utilize at least one sensor 130 and/or any additional sensors 140 coupled to the printing apparatus 100 to scan or capture the image of at least one image or any additional images of the print job being printed by at least one print head array 110 or any additional print head arrays 120. Further, at least one sensor 130 and/or any additional sensors 140 may be utilized to scan and detect when a nozzle head has crashed, when a nozzle has clogged, when a print head has failed, and/or when there is a misalignment. At least one sensor 130 and any additional sensors 140 may be a scanner, camera or any other form of imaging device that may capture an image and create a copy of the image.

After scanning at least one image with at least one sensor 130 and/or any additional sensors 140, the print controller software 170 may create a scanned copy of at least one image. The scanned copy of at least one image and/or any additional image may be a corresponding copy of at least one image and/or any additional image that has finished printing or is currently being printed. Once the scanned copy of at least one image has been created, the print controller software 170 may compare the scanned copy of at least one image to a corresponding digital copy of at least one image. The digital copy of at least one image may be a digital target image of what at least one image should look like. After comparing the scanned copy of at least one image to a digital copy of at least one image, the print controller software 170 may determine an amount of error between the scanned copy of at least one image and the digital copy of at least one image.

In determining the amount of error, the print controller software 170 may count and store the number of defects in the scanned copy of at least one image in comparison to the digital copy of at least one image. In counting the number of defects, the print controller software 170 may scan for any missing pixels, incorrect colors, incorrect position of printing, and/or any combination of the previous errors in comparison to the digital copy of at least one image and count the number of defects. Additionally, the print controller software 170 may use the number of defects found in the scanned copy of at least one image to create a letter grade from A through F for the scanned copy of at least one image. Further, the print controller software 170 may use the number of defects found in the scanned copy of at least one image to calculate a percentage of error and/or defects found in the scanned copy of at least one image in comparison to the digital copy of at least one image. The print controller software 170 may then utilize the results to create an image quality defect value.

The image quality defect value is a value such as a numerical number, a letter grade, or a percentage that may be used to indicate a level of defectiveness of an image. As noted above, the image quality defect value may be a letter grade indicating the level of quality of the image. Additionally, the image quality defect value may be a numerical value specifically indicating the number of defects found in at least one image or the image quality defect value may be percentage indicating the percentage of defect of the image.

As noted above, the print controller software 170 may determine whether at least one print head array 110, coupled to the printing apparatus 100, needs to be serviced. In determining whether at least one print head array 110 needs to be serviced, the print controller software 170 may scan for a nozzle head crash, a clogged nozzle, a failure of a print head, a misalignment, and/or an image quality defect value being above a threshold value. If any of the previous are detected, the print controller software 170 may determine that at least one print head array 110 needs to be serviced. At least one print head array 110 and/or any additional print head arrays 120 may need to be serviced when additional factors occur or are detected in addition to and/or in lieu of those depicted above.

The threshold value utilized above may be a predefined value created by the printing apparatus, downloaded and stored through a network from another printing apparatus or computer, and/or created manually by a user. Similar to the image quality defect value, the threshold value may be a value such as a numerical number, a letter grade, or a percentage that may be used to indicate the level of defectiveness of an image. Further each print job and/or image printing may have a corresponding threshold value that may be the same or may vary depending on user or system preference for quality and/or quantity produced.

A user or the printing apparatus 100 may choose quantity produced over quality when the image quality is not as important as getting as many copies printed as possible by defining a lower image quality defect value. As a result, at least one print head array may need to be serviced less frequently and an amount of time the printing apparatus 100 is up may be increased. Alternatively, the user or printing apparatus 100 may determine that image quality is more important, where as the quantity is not as important a factor by defining a higher image quality defect value. As a result, at least one print head array 110 and/or at least one additional print head array 120 may need to be serviced more frequently, however the image quality of the prints will be insured to be of higher quality. The present invention thus offers flexible printing to accommodate different preferences for one or more users depending on different circumstances while contiguously printing at least one image and/or any additional images of a print job.

If at least one print head array 110 is determined to need servicing, the print controller software 170 may further determine whether servicing at least one print head array 110 will interrupt at least one image from a print job from completing. In determining whether at least one print head array 110 will interrupt at least one image from a print job from completing, the print controller software 170 may access the corresponding print job and determine whether at least one image from the print job is currently active. Additionally, the print controller software 170 may check whether at least one print head array 110 or any additional print head array 120 is currently active. If at least one image from the print job is not active or at least one print head array 110 and/or any additional print head array 120 is not active, the print controller software 170 may determine that servicing at least one print head array 110 will not interrupt at least one image from the print job from completing. Further, if at least one image from the print job is active or at least one print head array 110 and/or any additional print head array 120 is active, the print controller may determine that servicing at least one print head array 110 will interrupt at least one image from the print job from completing.

If servicing at least one print head array 110 will not interrupt at least one image from the print job from completing and at least one print head array 110 needs to be serviced, the print controller software 170 may issue an instruction to move at least one print head array 110 to a service station 130. After moving at least one print head array to a service station 130, the print controller software 170 may then proceed to configure at least one additional print head array 120 to continue the print job when at least one additional print head array 120 is functional and at a position following at least one print head array 110. At least one additional print head array 120 is functional when it does not need to be serviced.

If servicing at least one print head array 110 will interrupt at least one image from the print job from completing and at least one print head array 110 needs to be serviced, the print controller software 170 may proceed to determine whether to continue printing at least one image from the print job. In determining whether to continue printing at least one image from the print job, the print controller software will again consider whether at least one image from the print job has an image quality defect value above a predefined threshold value.

If at least one image does from the print job does not have an image quality defect value above threshold value, the print controller may configure at least one additional print head array 120 to wait until after at least one image from the print job has completed printing before continuing the print job when at least one additional print head array 120 is functional and at a position following at least one print head array 110. If at least one image from the print job has an image quality defect value above threshold value, the print controller may interrupt at least one image from the print job from completing and configure at least one additional print head array 120 to continue printing the at least one image from the print job when at least one additional print head array 120 is functional and at a position following at least one print head array 110.

As a result, the printing apparatus 100 may contiguously print an existing image of the print job or continue printing the print job, while reducing the number of unacceptable images printed and maintain a higher number of acceptable images that have an image quality value that is above a threshold value.

While printing the print job with at least one additional print head array 120, the print controller software 170 may send an instruction to service at least one print head array 110 at the service station 130. If at least one print head array 110 has not already been moved to the service station 130, the print controller software 170 may issue an instruction to move at least one print head array 110 to the service station 130 for servicing.

A service station 130 is a position in the printing apparatus 100 that is currently not printing and where at least one print head array 110 may be serviced. Servicing at least one print head array 110 and/or any additional print head array 120 may include recovering a nozzle head after a crash, unclogging a clogged nozzle, replacing a failed print head, realigning at lease one print head and/or nozzle after a misalignment, and/or recalibrating at least one print head and/or nozzle to increase image quality. Servicing at least one print head array 110 and/or any additional print head array 120 may include performing additional functions and/or operations to improve image quality and reduce defects in addition to and/or in lieu of those depicted above. After at least one print head array 110 has been serviced, the print controller software 170 may configure at least one print head array 110 to resume printing the print job being printed by at least one additional print head array 120.

Further, the print controller software 170 may identify at least one image or any additional images of the print job that may have an image quality defect value above a threshold value. The print controller software may identify at least one image or any additional images of the print job that may have an image quality defect value above a threshold value by issuing an instruction for a video display device coupled to the printing apparatus 100 to output defect message whenever at least one image or any additional images of the print job has have an image quality defect value above a threshold value. A video display device may be a device coupled to the printing apparatus that may display images and/or text. Additionally, the video display device may be embedded into the printing apparatus 100 or coupled physically or wirelessly to the printing apparatus 100.

Additionally, in identifying at least one image and/or any additional images of the print job that may have an image quality defect value above a threshold value, the print controller software 170 may also configure at least one print head array 110, at least one additional print head array 120, and/or at least one secondary printing apparatus 180 to mark at least one image and/or any additional image of the print job when the corresponding image has an image defect value above a threshold value. A secondary printing apparatus 180 may be a print head array, a print head, and/or a stamp that may mark at least one or more images of a print job. The print controller software 170 may further keep a log of at least one image and/or any additional image of the print job that has been marked using a log that may be stored as a file on the printing apparatus, a computer readable medium, and/or through a network. The print controller software 170 may identify and/or mark at least one image or any additional image of a print job that has an image quality defect value above a threshold value using additional means and/or devices in addition to and/or in lieu of those depicted above and FIG. 1.

The print controller software 170 may also determine whether at least one image and/or any additional image from the print job has not been printed by examining the print job and determining whether any images of the print job have timed out and/or are still queued for printing. Further, the print controller software 170 may issue an instruction to reprint at least one image or any additional images from the print job when at least one image or any additional images from the print job have not been printed or when an image quality defect value of the corresponding image are above a threshold value that may be predefined. The print controller software may issue additional instructions, perform additional functions, and/or control additional devices and/or components in addition to and/or in lieu of those noted above and depicted in FIG. 1.

Figure 2:
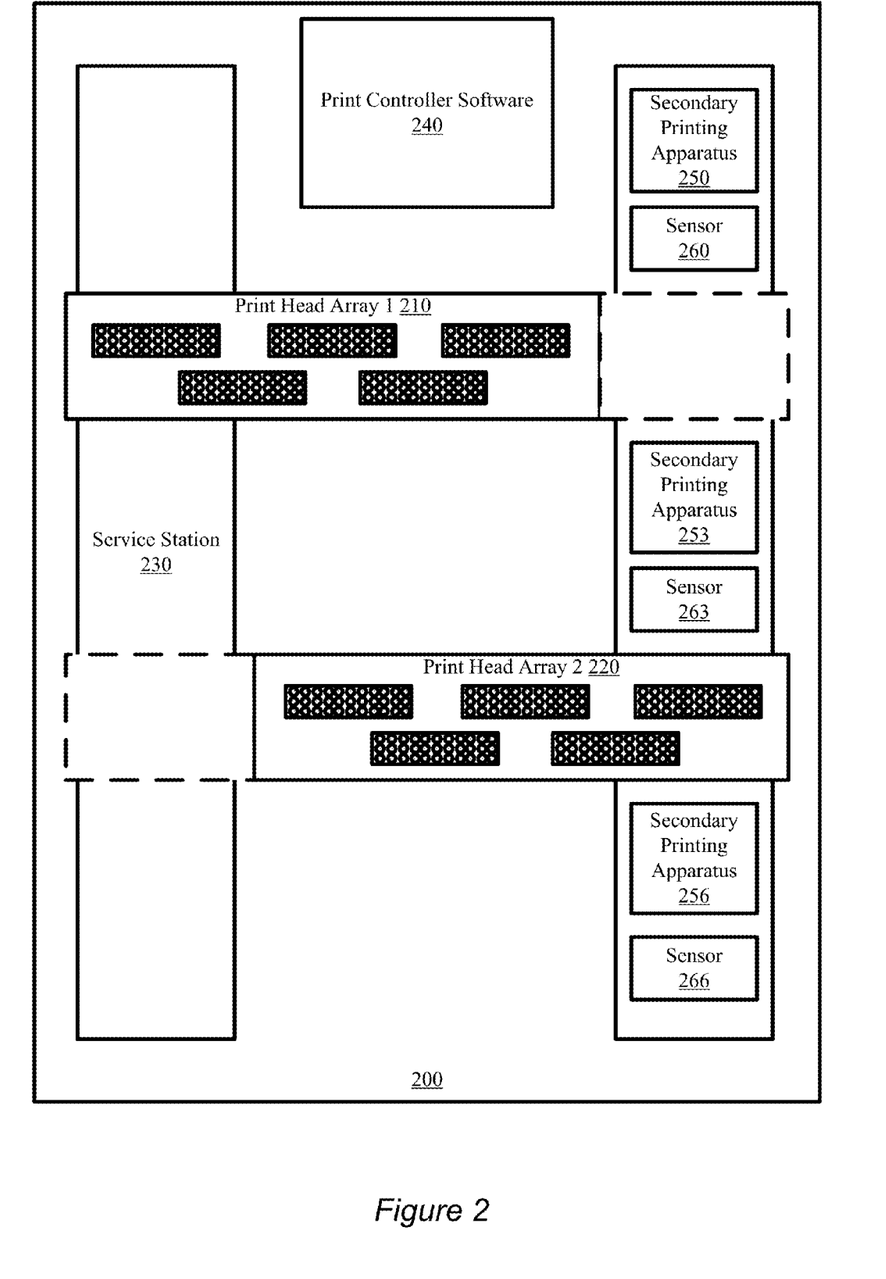
FIG. 2 illustrates a print controller software coupled to a printing apparatus configuring at least one sensor to detect when at least one print head array needs to be serviced, servicing at least one print head array at a servicing station, configuring at least one additional print head array to continue a print job started by at least one print head array, and at least one secondary printing apparatus that may mark at least one image according to an embodiment of the invention.

FIG. 2 illustrates a print controller software coupled to a printing apparatus configuring at least one sensor to detect when at least one print head array needs to be serviced, servicing at least one print head array at a servicing station, configuring at least one additional print head array to continue a print job started by at least one print head array, and at least one secondary printing apparatus that may mark at least one image according to an embodiment of the invention. As illustrated in FIG. 2, the printing apparatus may include a print controller software, at least one print head array, a service station, at least one secondary printing apparatus, and at least one sensor. The printing apparatus may include additional components and/or devices in addition to and/or in lieu of those depicted in FIG. 2 and noted above.

In one embodiment, a sheet or web of media may be traveling down stream and initially make contact with print head array 210 before making contact with print head array 220. As a result for the present embodiment, print head array 210 will hereby be referred to as at least one print head array 210, and print head array 220 will hereby be referred to as at least one additional print head array 220. As noted above, the print controller software 240 may instruct at least one print head array 210 and/or at least one additional print head array 220 to print at least one image of a print job. As illustrated in FIG. 2 and noted above, the printing apparatus 200 may include at least one print head array 210 and at least one additional print head array 220 that may be functional or may need servicing. At least one print head array 210 and at least one additional print head array 220 may include one or more print heads. Further, one or more print heads may further include one or more nozzles where ink may be fired out of and onto at least one sheet of media to create at least one image of a print job.

Further, the print controller software 240 may then determine when at least one print head array 210 and/or at least one additional print head array 220 needs to be serviced. As noted above, in determining whether at least one print head array 210 and/or at least one additional print head array 220 needs to be serviced, the print controller software 240 may configure at least one sensor 260, 263, 266 to scan at least one image of a print job for defects, detect when a nozzle head has crashed, when a nozzle has clogged, when a print head has failed, and/or when there is a misalignment. At least one sensor 260, 263, 266 may be located at different positions on the printing apparatus 200. Additionally, as noted above, at least one sensor 260, 263, 266 may be a scanner, camera or any other form of imaging device that may capture an image and create a copy of the image.

In one embodiment, a sheet of media may be traveling in a downward stream and the sheet of media may already have at least one image printed on it. At least one sensor 260 may initially scan the sheet of media and determine that it has an image quality defect value above a threshold value and thus determine that at least one print head array 210 and/or at least one additional print head array 220 needs to be serviced. Alternatively, the sheet of media may be traveling in a downward stream and the sheet of media may not be printed on yet, at least one sensor 260 may initially scan the image and determine that there are no defects. At least one print head array 210 may then proceed to print on the sheet of media, however at least one additional sensor 263 may determine that the image printed now has an image quality defect value above a threshold value. The print controller software 240 may then determine that at least one print head array 210 needs to be serviced. In another embodiment, at least one sensor 260 and at least one additional sensor 263 may determine that an image quality defect value is not above a threshold value, the print controller software 240 may then proceed to instruct at least one additional print head array 220 to print. At least one additional sensor 266 may then scan the image and determine that the image has an image quality defect value above a threshold value. The print controller software 240 may then determine that at least one additional print head array 220 needs to be serviced. As a result, the present invention may accurately determine whether at least one print head array 210, whether at least one additional print head array 220, or both print head arrays need to be serviced.

As noted above, at least one print head array 210 and/or at least one additional print head array 220 may need to be serviced at a servicing station 230 when at least one image of a print job has an image defect value above a threshold value, when a nozzle head has crashed, when a nozzle is clogged, when a print head has failed, and/or when there is a misalignment. As noted above, the service station 230 may be a position in the printing apparatus 200 that is currently not printing and where at least one print head array 210 may be serviced. Additionally, as noted above, at least one print head array 210 and/or any additional print head array 220 may be serviced by recovering a nozzle head after a crash, unclogging a clogged nozzle, replacing a failed print head, realigning at lease one print head and/or nozzle after a misalignment, and/or recalibrating at least one print head and/or nozzle to increase image quality. The servicing of at least one print head array 210 and/or at least one additional print head array 220 at the service station 230 may be performed automatically by the printing apparatus 200 or manually by one or more users.

As noted above, after at least one print head array 210 or at least one additional print head array 220 has been serviced, the print controller may configure the print head array 210,220 which has been serviced to resume printing the print job. Additionally, when at least one print head array 210 needs to be serviced, at least one print head array 210 may need to be moved to a service station. Further, as noted above, at least one additional print head array 220 may be configured to continue printing at least one image of the print job or continue printing the print job started by at least one print head array 210 when at least one additional print head array is functional. At least one additional print head array 220 is functional when it does not need to be serviced.

Further as noted above, at least one image of the print job may be marked by at least one print head array 210, at least one additional print head array 220, and/or at least one secondary printing apparatus 250, 253, 256 when the image has an image defect value above a threshold value. Additionally, as noted above, at least one secondary printing apparatus 250, 253, 256 may be a print head array, a print head, and/or a stamp that may mark at least one or more images of a print job.

In one embodiment, where a sheet of media is traveling in a downstream and at least on image has already been printed on the sheet, at least one sensor 260 may initially determine that the image printed on the sheet already has an image defect value above a threshold value. The print controller software may then instruct at least one secondary printing apparatus 250 to mark the image. Additionally, at least one sensor may determine that the image does not have an image quality defect value above a threshold value and at least one print head array 210 may proceed to print on the sheet of media. At least one additional sensor 263 may then scan the image and determine that the image has an image quality defect value above a threshold value. At least one secondary printing apparatus 253 may then mark the image. In another embodiment, at least one sensor 260 and at least one additional sensor 263 may determine that the image does not have an image quality defect value above a threshold value and at least one additional print head array 220 may proceed to print on the sheet of media. At least one additional sensor 266 may then scan and determine that the image has an image quality defect value above a threshold value and at least one secondary printing apparatus 256 may then mark the image.

Figure 3:
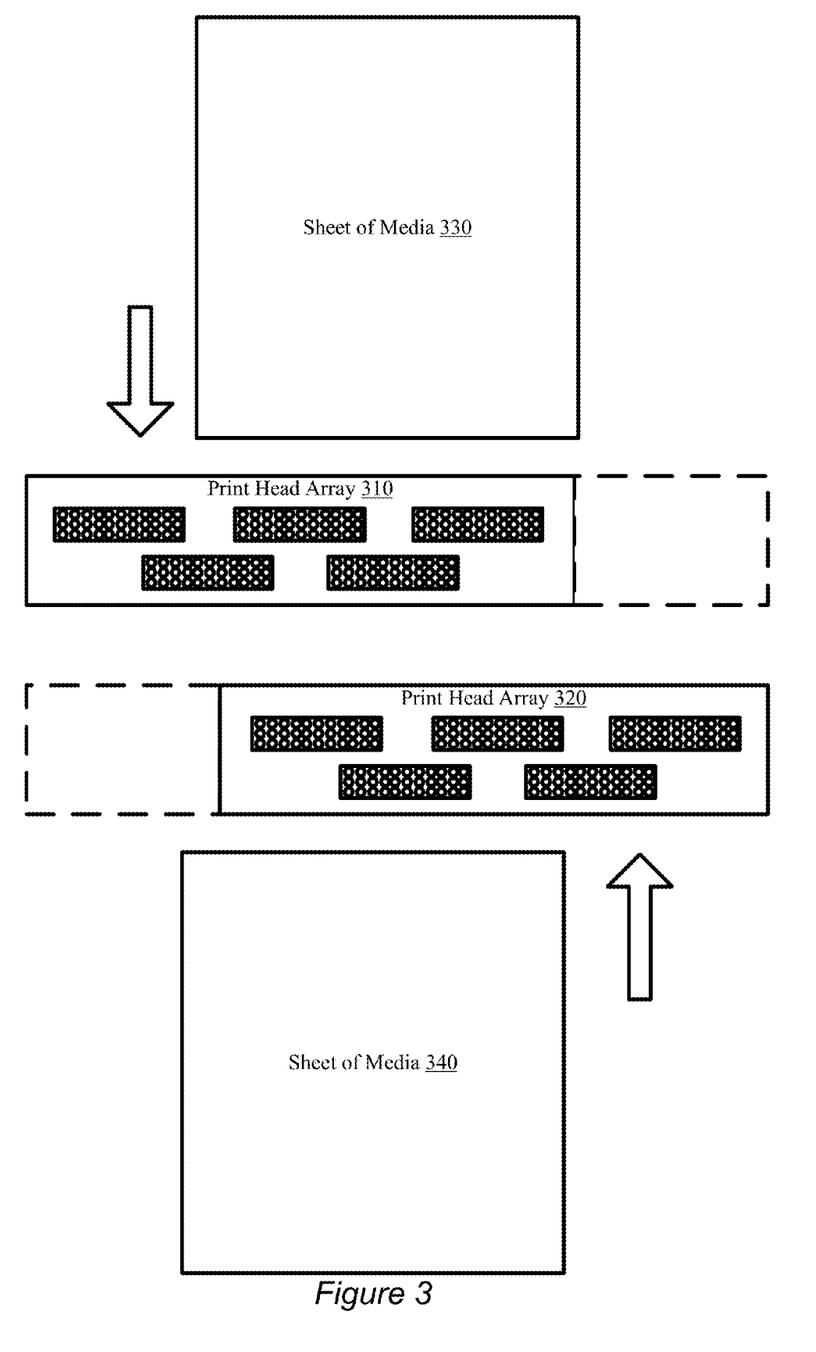
FIG. 3 illustrates at least one additional print head array that may be functional and at a position following at least one print head array when at least one sheet of media travels in an upward stream and/or downward stream according to an embodiment of the invention.

FIG. 3 illustrates at least one additional print head array that may be functional and at a position following at least one print head array when at least one sheet of media travels in an upward stream and/or downward stream according to an embodiment of the invention. As noted above, at least one print head array 310 and/or at least one additional print head array 320 may be functional if they do not require servicing. Further, at least one additional print head array 320 is at a position following at least one print head array 310 when at least one sheet of media 330,340 makes contact with at least one additional print head array after initially making contact with at least one print head array 310 following a direction of travel for at least one sheet of media 330,340.

As illustrated in FIG. 3, in one embodiment, a sheet of media 330 may travel in a downward stream in the printing apparatus. Following the downward stream, the sheet of media 330 may make contact with print head array 320 after initially making contact with print head array 310. As a result, print head array 320 may be at a position following print head array 310. In another embodiment, as illustrated in FIG. 3, a sheet of media 340 may travel in an upward stream in the printing apparatus. Following the upward stream, the sheet of media 340 may make contact with print head array 310 after initially making contact with print head array 320. As a result, print head array 310 may be at a position following print head array 320.

Figure 4:
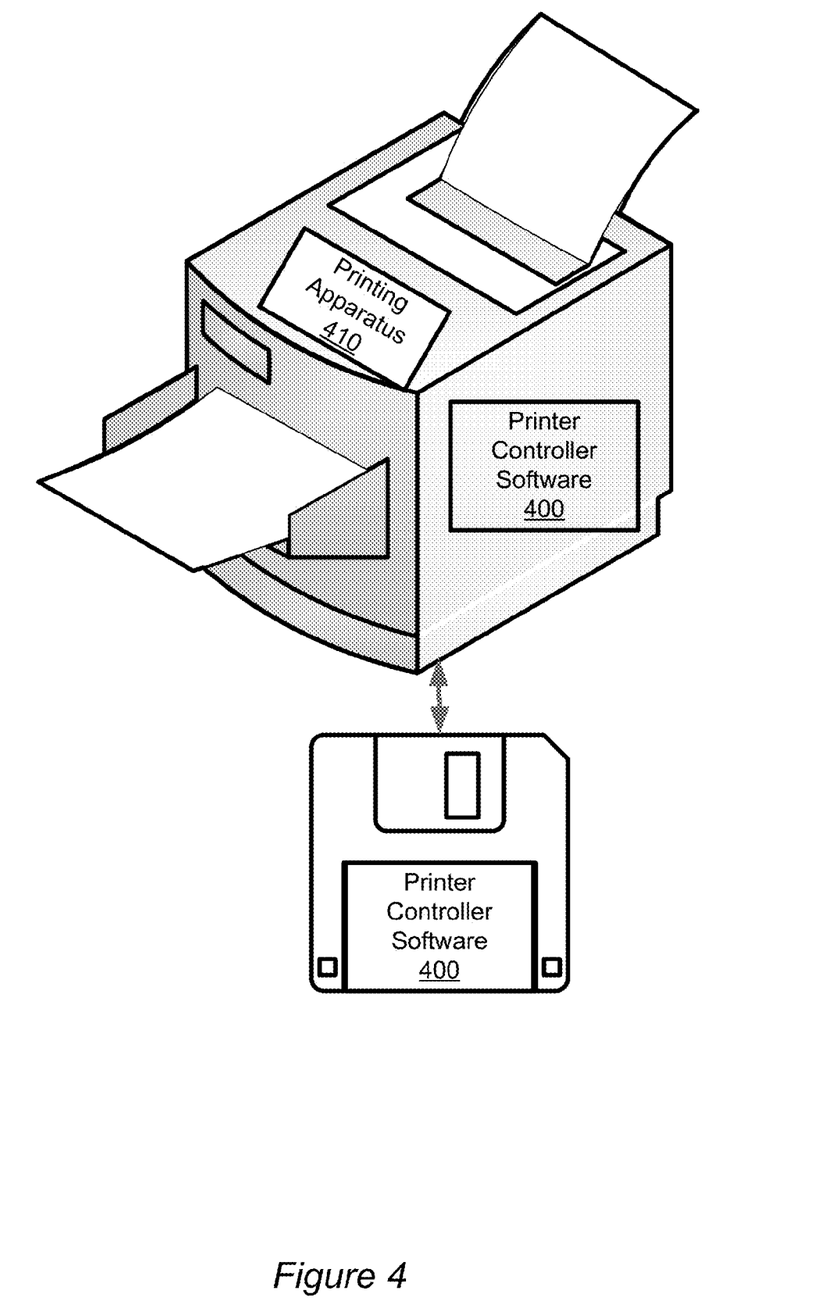
FIG. 4 illustrates a printer controller software that may be embedded into the printing apparatus and/or may be stored on a removable medium being accessed by a printing apparatus according to an embodiment of the invention.

FIG. 4 illustrates a printer controller software that may be embedded into the printing apparatus and/or may be stored on a removable medium being accessed by a printing apparatus according to an embodiment of the invention. As noted above, the printer controller software 400 may control and/or manager the hardware components of the printing apparatus by sending instructions and/or commands to each component of the printing apparatus independently or in conjunction using one or more communication channels.

Further, as noted above, the printer controller software 400 may be firmware that may be imbedded into one or more components of the printing apparatus 410. Additionally, the printer controller software 400 may be a software application which may be stored and accessed from a hard drive, a compact disc, a flash disk, a network drive or any other form of computer readable medium that is coupled to the printing apparatus. In one embodiment, the printer controller software 400 may be stored on a server or another device that may or may not be coupled to the printing apparatus 410. The printing apparatus 410 may utilize a local area network or a wide area network to store and access the printer controller software 400. The printer controller 400 may be stored and accessed from additional devices in addition to and/or in lieu of those depicted in FIG. 4.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

Figure 5:
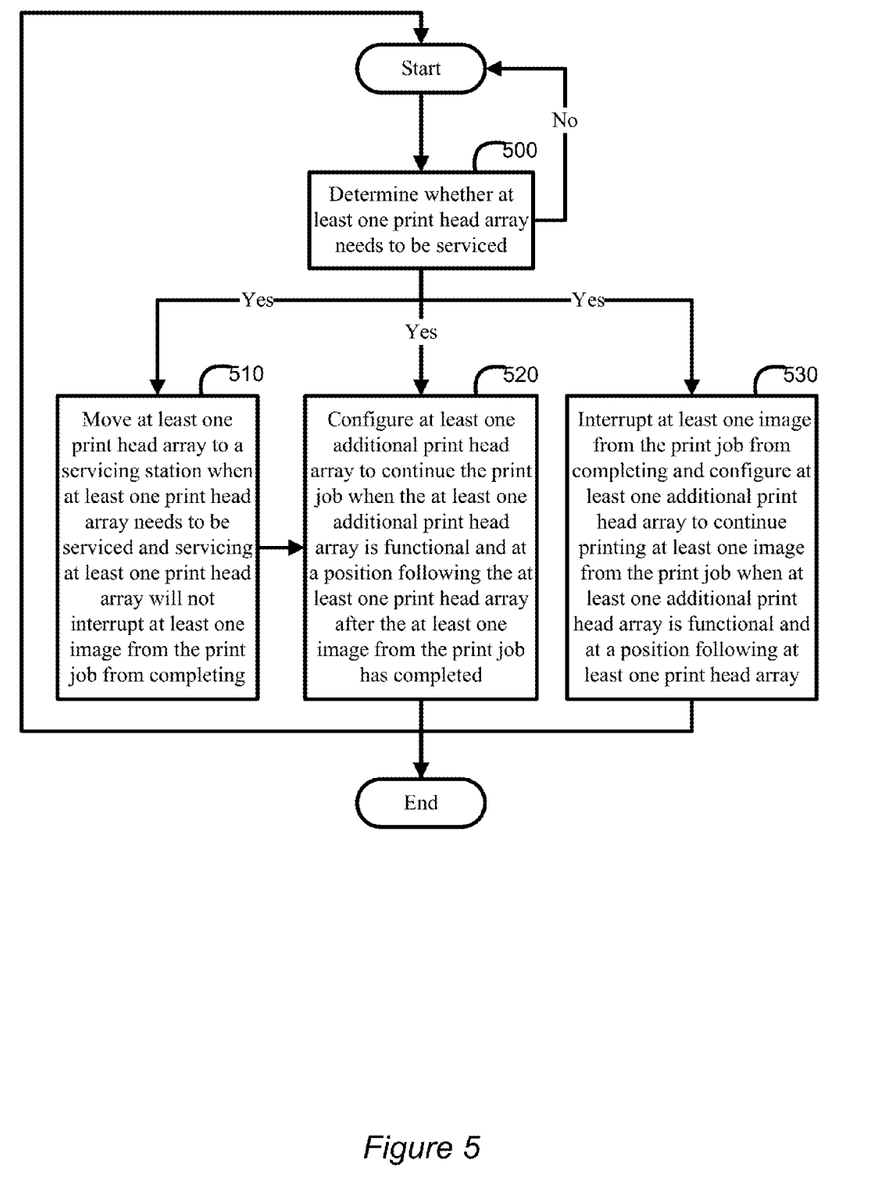
FIG. 5 is a flow chart illustrating a method for continuing a print job started by at least one print head array utilizing at least one additional print head array when at least one print head array needs to be serviced according to an embodiment of the invention.

FIG. 5 is a flow chart illustrating a method for continuing a print job started by at least one print head array utilizing at least one additional print head array when at least one print head array needs to be serviced according to an embodiment of the invention. The method of FIG. 5 may utilize a print controller software, at least one sensor, at least one print head array, at least one additional print head array, and a servicing station. The method of FIG. 5 may utilize additional components and/or devices in addition to and/or in lieu of those noted above and illustrated in FIGS. 1 and 2.

As noted above, a print controller software may initially determine whether at least one print head array needs to be serviced 500. If at least print head array needs to be serviced, the print controller software may then issue an instruction to move at least one print head array to a servicing station when at least one print head array needs to be serviced and servicing at least one print head array will not interrupt at least one image from the print job from completing 510. The print controller software may then configure at least one additional print head array to continue the print job when at least one additional print head array is functional and at a position following at least one print head array after at least one image from the print job has completed 520.

Alternatively, if at least one print head array needs to be serviced, the print controller software may initially wait until at least one image from the print job has completed before configuring at least one additional print head array to continue the print job when at least one additional print head array is functional and at a position following the at least one print head 520.

Additionally, if at least one print head array needs to be serviced, the print controller software may send an instruction to interrupt at least one image from the print job from completing and configure at least one additional print head array to continue printing at least one image from the print job when at least one additional print head array is functional and at a position following at least one print head array 530.

The process may then be complete or the print controller software may continue to determine whether at least one print head array needs to be serviced and repeat the method disclosed in FIG. 5. The method of FIG. 5 may include additional steps in addition to and/or in lieu of those depicted in FIG. 5.

Figure 6:
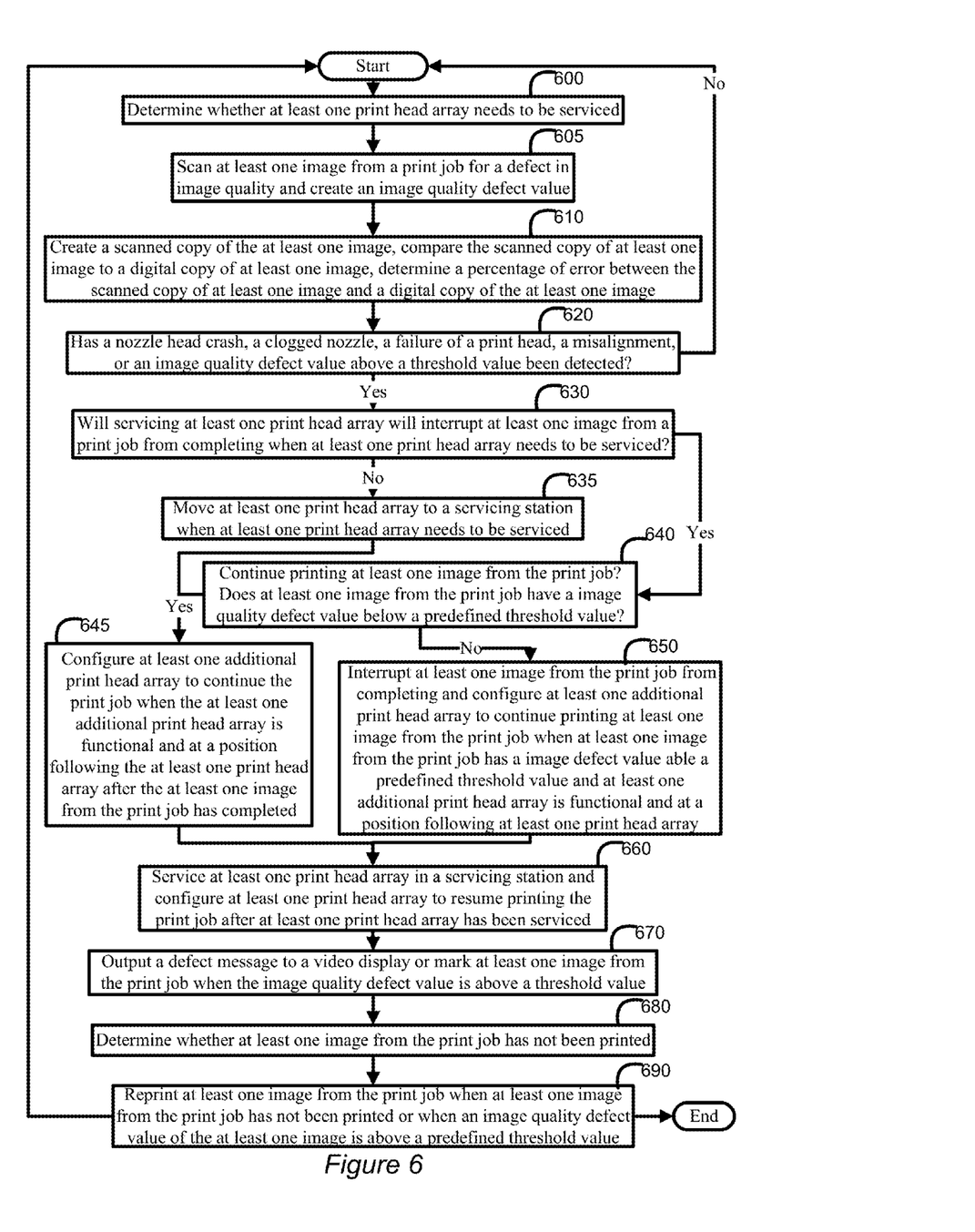
FIG. 6 is a flow chart illustrating a method for determining whether at least one print head array needs to be serviced, continuing a print job started by at least one print head array utilizing one additional print head array when at least one print head array needs to be serviced, servicing at least one print head array, and reprinting at least one image according to an embodiment of the invention.

FIG. 6 is a flow chart illustrating a method for determining whether at least one print head array needs to be serviced, continuing a print job started by at least one print head array utilizing one additional print head array when at least one print head array needs to be serviced, servicing at least one print head array, and reprinting at least one image according to an embodiment of the invention. The method of FIG. 6 may utilize a print controller software, at least one sensor, at least one print head array, at least one additional print head array, at least one secondary printing apparatus, and a servicing station. The method of FIG. 6 may utilize additional components and/or devices in addition to and/or in lieu of those noted above and illustrated in FIGS. 1 and 2.

As noted above, the print controller software may initially determine whether at least one print head array needs to be serviced 600. Further, as noted above, in determining whether at least one print head array needs to be serviced, the print controller software may scan at least one image from a print job for a defect in image quality and create an image quality defect value 605. In creating the image quality defect value, the print controller software may create a scanned copy of at least one image, compare the scanned copy of at least one image to a digital copy of at least one image, and determine an amount of error between the scanned copy of at least one image and at least one digital copy of at least one image 610.

The print controller software may then determine whether a nozzle head crash, a clogged nozzle, a failure of a print head, a misalignment, or an image quality defect value above a threshold value been detected 620. If none have been detected, the print controller software may continue to have at least one print head array print and continue to determine whether at least one print head array needs to be serviced 600. If a nozzle head crash, a clogged nozzle, a failure of a print head, a misalignment, or an image quality defect value above a threshold value has been detected, then the print controller software may proceed to determined whether servicing at least one print head array will interrupt at least one image from a print job from completing when at least one print head array needs to be serviced 630.

If at least one image from a print job will not be interrupted, the print controller may proceed to move at least one print head array to a servicing station when at least one print head array needs to be serviced 635. The print controller software may then configure at least one additional print head array to continue the print job when the at least one additional print head array is functional and at a position following the at least one print head array 645.

If at least one image from the print job will be interrupted, the print controller software may then determine whether to continue printing at least one image from the print job 640. In determining whether to continue printing at least one image from the print job, the print controller software may check whether the image defect value is above a predefined threshold value 640.

If the image defect value is not above a threshold value, the print controller software may configure at least one additional print head array to wait until after at least one image from the print job has completed before continuing the print job when at least one additional print head array is functional and at a position following the at least one print head array 645. As noted above, at least one additional print head array is at a position following at least one print head array when at least one sheet of media makes contact with the at least one additional print head array after initially making contact with at least one print head array following a direction of travel for the at least one sheet of media.

If the image defect value is above a threshold value, the print controller software may interrupt at least one image from the print job from completing and configure at least one additional print head array to continue printing at least one image from the print job when at least one additional print head array is functional and at a position following at least one print head array 650. While at least one additional print head array is printing the print job, at least one print head array may be serviced in a servicing station. After at least one print head array has been serviced, the print controller software may configure at least one print head array to resume printing the print job 660.

The print controller software may output a defect message to a video display or mark at least one image from the print job when an image quality defect value is above a threshold value 670. As noted above, at least one print head array, at least one additional print head array, and/or at least one secondary printing apparatus may be configured to mark at least one image when the image quality defect value is above a threshold value.

The print controller software may then proceed to determine whether at least one image from the print job has not been printed 680. The print controller software may then reprint at least one image from the print job when at least one image from the print job has not been printed or when an image quality defect value of the at least one image is above a threshold value 690. As noted above, the threshold value may be predefined by a user or the printing apparatus. The process may then be complete or the print controller software may continue to determine whether at least one print head array needs to be serviced and repeat the method disclosed in FIG. 6. The method of FIG. 6 may include additional steps in addition to and/or in lieu of those depicted in FIG. 6.

What is claimed is:

1. A printing apparatus comprising:
   at least one print head array;
   a servicing station to service the at least one print head array; and
   a print controller to:
      initiate printing of a print job by the at least one print head array;

in response to determining that the at least one print head array should be serviced, determine whether the servicing of the at least one print head array will interrupt the print job;
in response to determining that the servicing will not interrupt the print job, cause movement of the at least one print head array from a given position to the servicing station;
in response to determining that the servicing will interrupt the print job,
determine whether an image quality defect value associated with printing at least one of image of the print job exceeds a threshold;
in response to determining that the image quality defect value does not exceed the threshold, continue printing the at least one image with the at least one print head array;
in response to determining that the image quality defect value exceeds the threshold,
cause movement of the at least one print head array from the given position to the servicing station; and
control at least one additional print head array to continue and complete printing the at least one image started by the at least one print head array.

2. The printing apparatus of claim 1 wherein the print controller is further to scan the at least one image of the print job with at least one sensor and identify the at least one image of the print job when a defect in image quality is detected by marking the at least one image of the print job, wherein marking the at least one image of the print job includes causing the at least one print head array or the at least one additional print head array to print a defect mark on the at least one image from the print job.

3. The printing apparatus of claim 2, wherein the at least one sensor comprises a digital imaging device or a scanner to continuously scan the at least one image of the print job.

4. The printing apparatus of claim 1, further comprising at least one secondary printing apparatus to mark the at least one image of the print job responsive to detecting a defect in image quality above a predefined threshold value.

5. The printing apparatus of claim 1 wherein the print controller is to further instruct the at least one print head array to print the at least one image.

6. The printing apparatus of claim 1, wherein the image quality defect value is computed based on an amount of defect associated with printing the at least one image.

7. The printing apparatus of claim 1 wherein the print controller is to compute the image quality defect value by:
creating a scanned copy of the at least one image;
comparing the scanned copy of the at least one image to a digital copy of the at least one image; and
determining an amount of error between the scanned copy of the at least one of image and the digital copy of the at least one image.

8. The printing apparatus of claim 7, wherein the determined amount of error is a percentage of error between the scanned copy of the at least one image and the digital copy of the at least one image.

9. The printing apparatus of claim 1, wherein the determining that the at least one print head array should be serviced is responsive to detecting one of a failure of the at least one print head array, clogging of a nozzle of the at least one print head array, and misalignment of the at least one print head array.

10. A method comprising:
performing, by a print controller:
initiating printing of a print job by at least one print head array of a printing system;
in response to determining that the at least one print head array should be serviced, determining whether the servicing of the at least one print head array will interrupt the print job;
in response to determining that the servicing will not interrupt the print job, causing movement of the at least one print head array from a given position to a servicing station of the printing system;
in response to determining that the servicing will interrupt the print job,
determining whether an image quality defect value associated with printing at least one of image of the print job exceeds a threshold;
in response to determining that the image quality defect value does not exceed the threshold, continuing printing the at least one image with the at least one print head array;
in response to determining that the image quality defect value exceeds the threshold,
causing movement of the at least one print head array from the given position to the servicing station; and
controlling at least one additional print head array to continue and complete printing the at least one image started by the at least one print head array.

11. The method of claim 10, wherein the at least one additional print head array is at a position following the at least one print head array along a direction of travel of a media sheet in the printing system.

12. The method of claim 10, further comprising:
servicing the at least one print head array in the servicing station; and
configuring the at least one print head array to resume printing the print job after the at least one print head array has been serviced by the servicing station.

13. The method of claim 12, wherein servicing the at least one print head array is selected from among recovering the at least one print head array after a crash, unclogging a clogged nozzle of the at least one print head array, replacing a failed print head of the at least one print head array, aligning the at least one print head array, and calibrating the at least one print head array.

14. The method of claim 10, wherein the determining that the at least one print head array should be serviced is responsive to detecting one of a failure of the at least one print head array, clogging of a nozzle of the at least one print head array, and misalignment of the at least one print head array.

15. The method of claim 10, further comprising outputting a defect message to a video display or marking the at least one image of the print job responsive to detecting the image quality defect value exceeding the threshold.

16. The method of claim 10, further comprising computing the image quality defect value by:
creating a scanned copy of the at least one image;
comparing the scanned copy of the at least one image to a digital copy of the at least one image; and
determining an amount of error between the scanned copy of the at least one image and the digital copy of the at least one image.

17. The method of claim 16, wherein the determined amount of error between the scanned copy of the at least one image and the digital copy of the at least one image is a percentage of error between the scanned copy of the at least one image and the digital copy of the at least one image.

18. A non-transitory computer-readable storage medium storing instructions that upon execution by a print controller causes the print controller to:
  initiate printing of a print job by at least one print head array of a printing system;
  in response to determining that the at least one print head array should be serviced, determine whether the servicing of the at least one print head array will interrupt the print job;
  in response to determining that the servicing will not interrupt the print job, cause movement of the at least one print head array from a given position to a servicing station of the printing system;
  in response to determining that the servicing will interrupt the print job,
    determine whether an image quality defect value associated with printing at least one of image of the print job exceeds a threshold;
    in response to determining that the image quality defect value does not exceed the threshold, continue printing the at least one image with the at least one print head array;
    in response to determining that the image quality defect value exceeds the threshold,
      cause movement of the at least one print head array from the given position to the servicing station; and
      control at least one additional print head array to continue and complete printing the at least one image started by the at least one print head array.

19. The non-transitory computer-readable storage medium of claim 18, wherein the instructions upon execution cause the print controller to further:
  compute the image quality defect value by:
    creating a scanned copy of the at least one image;
    comparing the scanned copy of the at least one image to a digital copy of the at least one image; and
    determining an amount of error between the scanned copy of the at least one image and the digital copy of the at least one image.

20. The non-transitory computer-readable storage medium of claim 19, wherein the determined amount of error between the scanned copy of the at least one image and the digital copy of the at least one image is a percentage of error between the scanned copy of the at least one image and the digital copy of the at least one image.

* * * * *